United States Patent
Landes

(10) Patent No.: US 6,871,722 B2
(45) Date of Patent: Mar. 29, 2005

(54) METHOD AND APPARATUS FOR LIMITING TORQUE FROM A MOTOR

(75) Inventor: James W. Landes, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 19 days.

(21) Appl. No.: 10/025,721

(22) Filed: Dec. 19, 2001

(65) Prior Publication Data

US 2003/0111282 A1 Jun. 19, 2003

(51) Int. Cl.$^7$ ............................................. B60K 17/00
(52) U.S. Cl. ........................................................ 180/338
(58) Field of Search ................................. 180/337, 338, 180/197, 342

(56) References Cited

U.S. PATENT DOCUMENTS

| | | | |
|---|---|---|---|
| 5,164,903 A | | 11/1992 | Lin et al. |
| 5,598,336 A | * | 1/1997 | Kume et al. .................. 701/51 |
| 5,726,353 A | * | 3/1998 | Matsuda et al. ........... 73/118.1 |
| 6,479,906 B2 | * | 11/2002 | Uchida ..................... 290/40 C |
| 6,645,122 B2 | * | 11/2003 | Ishiguro et al. ............. 477/120 |

* cited by examiner

*Primary Examiner*—Faye M. Fleming
(74) *Attorney, Agent, or Firm*—Michael L Woods; Kelsey L Milman

(57) ABSTRACT

Apparatuses and methods for limiting torque of a motor on a vehicle. A torque limit determining device receives a weight signal indicative of an approximate weight of the vehicle. The torque limit determining device transmits a torque limit signal indicative of a torque limit for the motor as a function of the weight signal.

8 Claims, 1 Drawing Sheet

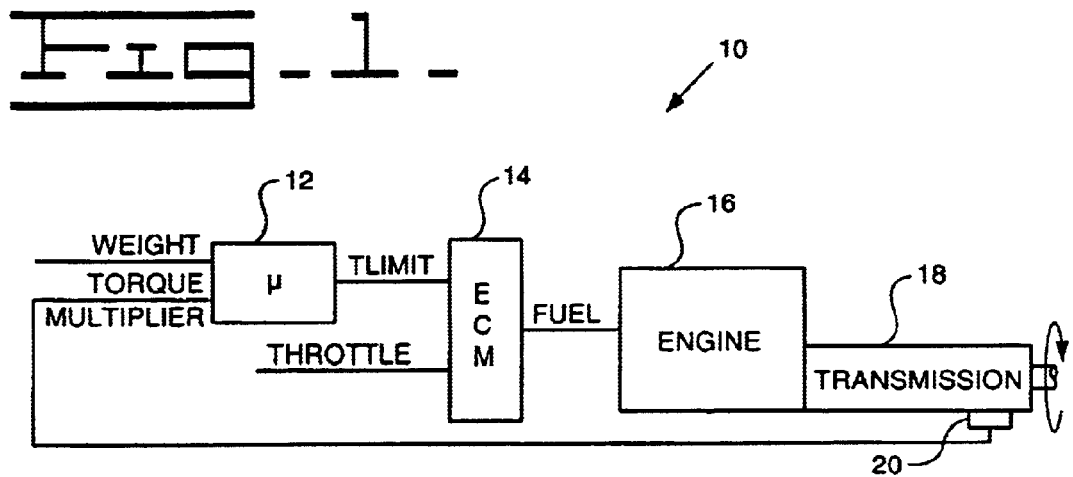
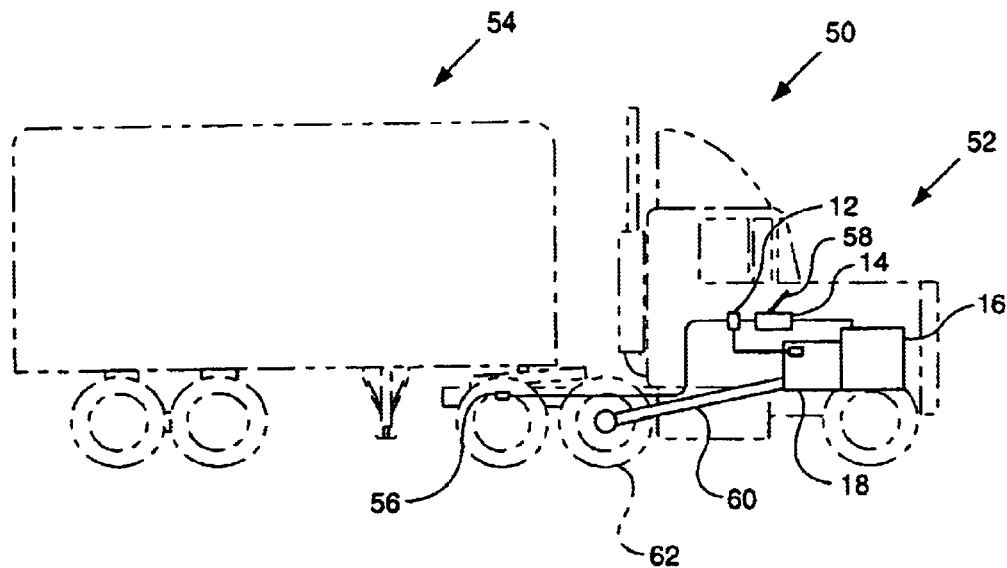

US 6,871,722 B2

METHOD AND APPARATUS FOR LIMITING TORQUE FROM A MOTOR

TECHNICAL FIELD

This invention relates generally to limiting the torque output from a motor on a motor vehicle, and more particularly, to limiting the torque as a function of the weight of the vehicle.

BACKGROUND

Motorized vehicles, and particularly on-highway trucks, operate at a variety of weights. The weight of a particular truck can vary over 100,000 lbs depending on whether it is loaded or empty. When loaded, the truck requires a relatively high torque to its wheels when accelerating. Thus, the engines of these trucks typically deliver a relatively high torque. The same truck, however, when unloaded or lightly loaded, will often have its tires slip, spin, or even leave "burnout" marks on the road surface when accelerating because the wheels receive the same relatively high torque even though the traction is less due to the reduced weight of the truck. This can contribute to increased wear and shortened lifespan of the tires, as well as inefficient fuel consumption.

SUMMARY OF THE INVENTION

The present invention provides apparatuses and methods for limiting torque of a motor on a vehicle. A torque limit determining device receives a weight signal indicative of an approximate weight of the vehicle. The torque limit determining device transmits a torque limit signal indicative of a torque limit for the motor as a function of the weight signal.

BRIEF DESCRIPTION OF THE DRAWINGS

FIG. 1 is a block diagram of an apparatus for limiting the torque of a motor vehicle according to one embodiment of the invention.

FIG. 2 shows a motor vehicle, such as a truck, according to one embodiment of the invention.

DETAILED DESCRIPTION

FIG. 1 is a block diagram of an apparatus 10 for limiting the torque of a motor vehicle according to one embodiment of the invention. The apparatus 10 typically includes a torque limit determining device 12. The torque limit determining device typically receives a weight signal WEIGHT indicative of a weight of the vehicle. The torque limit determining device 12 transmits a torque limit signal TLIMIT indicative of a torque limit for the motor of the vehicle as a function of the weight signal WEIGHT.

Typically, the heavier the vehicle, the higher the torque limit, and the lighter the vehicle, the lower the torque limit will be in order to prevent or reduce wheel slip. The particular relationship between the weight of the vehicle and the torque limit may vary depending on the particular preferences of the operator of the vehicle, the ground pressure of the vehicle, e.g., number of axles, size of tires, square footage of track or belts, etc. Depending on the amount of slip desired, an appropriate relationship between vehicle weight and maximum desired torque may be determined by any of a variety of ways known to those skilled in the art.

The weight of the vehicle may be determined by any of a variety of ways known to those skilled in the art. For example, in one embodiment of the invention, axle weight is used. In another embodiment of the invention, the forces acting on the suspension of the vehicle may be used. In yet another embodiment of the invention, the vehicle may actually be weighed, such as on a truck scale. In another embodiment of the invention, the weight of a known load may be added to a known (empty) weight of the vehicle. In another embodiment of the invention, tire pressure may be used.

In an embodiment of the invention, a control device, such as an engine control module 14 may be coupled with the torque limit determining device 12 to receive the torque limit signal TLIMIT. The engine control device 12 may also receive other signals known to those skilled in the art, such as a throttle signal THROTTLE, indicative of a desired characteristic of the engine, e.g., rotational speed, fuel and/or airflow to the combustion chamber. The throttle signal THROTTLE may come, for example, from an accelerator pedal, a lever, or a dial operated by the vehicle operator, be hardwired, or be from any of a variety of other devices and configurations known to those skilled in the art.

The engine control module 14 transmits a control signal indicative of a desired characteristic of the engine as a function of the torque limit signal TLIMIT and the throttle signal THROTTLE. For example, the engine control module 14 may transmit a fuel signal FUEL, indicative of a desired amount of fuel to be delivered to a combustion chamber or chambers of an engine.

The engine control module 14 may be implemented, for example, as a microprocessor, a microcomputer, a dedicated circuit and/or software. The control module could also be any of a variety of devices known to those skilled in the art.

An engine 16 may be coupled with the engine control module 14 to receive the control signal, e.g., fuel signal FUEL. The engine 16 transmits a force, such as a first torque at a first rotational speed on a drive shaft for example, as a function of the fuel signal FUEL by ways known to those skilled in the art.

In one embodiment of the invention, a transmission 18 may be coupled with the engine 16 to receive the first torque. The transmission 18 transmits a second torque at a second rotational speed as a function of the first torque by ways known to those skilled in the art. The particular relationship between the first torque and first rotational speed and the second torque and the second rotational speed is typically a function of the gear ratio of the transmission 18, and may be determined by ways known to those skilled in the art. In effect, the transmission 18 may be considered to be a torque multiplier.

Similarly, other fixed known components, such as a drive axle, may act as a torque multiplier. Their affect on the torque may be factored into the torque calculations by ways known to those skilled in the art.

The second torque output from the transmission 18 may be used to drive, for example, any of a variety of ground engaging traction devices of the motor vehicle, such as tires and/or tracks or belts, for example.

In an embodiment of the invention, a gear ratio determining device, such as a sensor 20 that detects the gear ratio of the transmission 18 by ways known to those skilled in the art, may be coupled with the transmission 18. The sensor 20 may transmit a gear ratio or torque multiplier signal TORQUE MULTIPLIER as a function of the gear ratio of the transmission 18.

The torque multiplier signal TORQUE MULTIPLIER may be received by the torque limit determining device 12 and be used to determine the torque limit signal TLIMIT. Typically, for a given fuel signal, the second torque output by the transmission 18 will vary depending on the gear ratio of the transmission 18 at that moment in time.

FIG. 2 shows a motor vehicle, such as a truck 50, according to one embodiment of the invention. The truck includes a cab section 52, and a cargo section 54 that may be integral with the cab section 52 or separate (as shown).

Typically the cab section 52 will include the apparatus 10 described above, although it could also be located elsewhere. The apparatus 10 functions similarly to that which is described above, and will not be repeated here.

A weight-determining device 56, such as a pressure sensor, may be coupled with a suspension of the truck 50. The weight-determining device 56 transmits the weight signal WEIGHT by ways known to those skilled in the art. Although the weight determining device 56 is shown for simplicity as being a single sensor located in a single spot, additional sensors and locations could also be used, such as one sensor on each axle or tire of the truck 50, for example. Additionally, the weight of the vehicle may be approximated by looking at the engine output and the vehicle dynamics, i.e., engine power output vs. acceleration. Generally, the heavier the vehicle, the more slowly it will respond to a change in engine power.

In an embodiment of the invention, an accelerator pedal 58 transmits the throttle signal THROTTLE to the engine control module 14 by ways known to those skilled in the art.

The second torque from the transmission is transmitted along a driveline 60 to at least one of a ground engaging traction device, such as a wheel and/or tire 62.

INDUSTRIAL APPLICABILITY

In operation, the weight of the motor vehicle is transmitted to the torque limit determining device 12. The torque limit determining device 12 may also receive a torque multiplier signal from a sensor 20 indicative of a gear ratio of the transmission 18. The torque limit determining device 12 transmits a torque limit as a function of the weight of the motor vehicle and the current gear ratio of the transmission.

The accelerator pedal transmits the throttle signal.

The engine control module 14 uses the torque limit and throttle signal to determine a maximum fuel quantity for the engine 16, and controls the fuel delivery to the engine 16 so that the fuel delivery does not cause a torque from the output of the transmission 18 in excess of the torque limit.

By appropriate selection of the torque limit, slipping of the tires 62 may be reduced when the truck 50 is lightly loaded, yet sufficient torque will still be provided to provide adequate, if reduced, acceleration.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus for limiting torque of a motor on a vehicle, comprising:

a torque limit determining device operable to receive a weight signal indicative of an approximate weight of the vehicle, the torque limit determining device operable to transmit a torque limit signal indicative of a torque limit for the motor as a function of the weight signal, and an engine control module coupled with the torque limit determining device to receive the torque limit signal, the engine control module further operable to receive a throttle signal indicative of a desired engine speed of the engine, the engine control module operable to transmit a fuel signal to the internal combustion engine as a function of the torque limit signal and the throttle signal, the fuel signal operable to control an amount of fuel delivered to a combustion chamber of the internal combustion engine.

2. The apparatus of claim 1 wherein the torque limit signal is operable to limit the torque output of the motor.

3. The apparatus of claim 1 wherein the motor comprises an internal combustion engine.

4. The apparatus of claim 1 wherein the vehicle includes a transmission coupled with the engine, further comprising:

a gear ratio determining device coupled with the transmission, the gear ratio sensor operable to transmit a torque multiplier signal indicative of a gear ratio of the transmission; and wherein the torque limit determining device is operable to be coupled with the gear ratio determining device to receive the torque multiplier signal, the torque limit determining device further operable to determine the torque limit signal as a function of the torque multiplier signal.

5. An apparatus for limiting torque of a motor on a vehicle, wherein the vehicle includes a transmission coupled with the engine, comprising:

a torque limit determining means for receiving a weight signal indicative of an approximate weight of the vehicle, the torque limit determining means operable to transmit a torque limit signal indicative of a torque limit for the motor as a function of the weight signal;

a gear ratio determining means coupled with the transmission, the gear ratio determining means operable to transmit a torque multiplier signal indicative of a gear ratio of the transmission; and wherein the torque limit determining means is operable to be coupled with the gear ratio determining means to receive the torque multiplier signal, the torque limit determining means further operable to determine the torque limit signal as a function of the torque multiplier signal.

6. A method for determining a torque limit for a motor of a vehicle, wherein the vehicle includes a transmission coupled with the motor, comprising:

determining a first value indicative of a weight of the vehicle;

determining a second value indicative of a torque limit of the motor as a function of the first value;

determining a third value indicative of a gear ratio of the transmission; and wherein determining the second value comprises determining the second value as a function of the first value and the third value.

7. The method of claim 6 wherein the motor comprises an internal combustion engine.

8. The method of claim 6, further comprising:

limiting the torque output of the motor as a function of the second value.

* * * * *